3,373,124
PHENOLIC RESIN ADHESIVE EXTENDED WITH PARTIALLY CARBONIZED CELLULOSIC MATERIAL
Fred Bryner, Midland, Mich., assignor to The Dow Chemical Company, Midland, Mich., a corporaton of Delaware
No Drawing. Continuation-in-part of application Ser. No. 213,901, Aug. 1, 1962. This application July 18, 1966, Ser. No. 565,744
16 Claims. (Cl. 260—17.2)

ABSTRACT OF THE DISCLOSURE

Highly extended, phenolic-resin based adhesives for wood products are prepared comprising, a material proportion up to about 1 part by weight of a finely divided, partially carbonized cellulosic material. The useful materials are obtained by heating cellulose at an elevated temperature until it undergoes a weight loss of about 10 to 35 weight percent. In addition, the adhesive composition contains a water-swellable extender, a basic catalyst for initiating the thermosetting reaction of the resin and sufficient water to adjust the total glue solids within the range from about 35 to about 65 weight percent of the total composition.

---

This application is a continuation-in-part of my application, Ser. No. 213,901, filed Aug. 1, 1962, now abandoned.

The present invention relates to novel adhesive compositions and articles manufactured therewith. More particularly, the invention concerns providing an efficient extender for liquid phenolic resin adhesive formulations.

The use of partially condensed phenol-aldehyde resins in thermosetting, adhesive formulations is a highly developed art. Most of such formulations, when ready for use, comprise, in addition to the resin, a liquid dispersing medium, a catalyst to promote resin cure, an extender or filler and sometimes special additives to modify such characteristics of the glue as its flowability, rate of cure, spreadability or viscosity.

Of primary concern herein are the extending components of phenolic resin adhesive formulations. Extenders are employed to reduce the relative proportion of resin solids required in a given adhesive formulation. Some of the extenders employed heretofore have been indicated to be useful in amounts up to as much as one part by weight per part by weight of resin solids. At such levels of extension, however, the adhesive formulations have generally been inadequate for the manufacture of exterior grade plywoods according to Douglas fir plywood commercial standards. For a definition of these standards, see the publication, "Douglas Fir Plywood Commercial Standard CS45–55."

A principal object of the invention is to provide a highly extended, liquid adhesive composition based on thermosetting phenolic resins. A particular object is to provide a phenolic resin adhesive formulation, suitable for exterior grade plywood manufacture, characterized by a substantially greater extension of the resin than that heretofore attained in such adhesive formulations. These and other objectives are accomplished in the invention hereinafter set forth.

According to the present invention, a highly extended phenolic resin adhesive formulation is obtained by uniformly mixing an aqueous phenolic resin with a combination of extenders consisting of a partially carbonized cellulosic material, in a finely divided form, and a water-swellable organic extender. The proportions of these materials vary within the limits from a material proportion of the partially carbonized cellulosic material, e.g. about 0.1 part, up to 1 part thereof per part of resin solids and, on a corresponding basis, from 0.01 part up to 0.5 part of the water-swellable organic extender, with an overall limitation being that no more than about 1.5 parts of the combination are employed for each part of resin solids to provide a glue suitable for exterior grade plywood. In addition to the foregoing components the complete formulation includes a basic catalyst for the thermosetting reaction of the phenolic resin and an effective amount of an aqueous dispersing medium. Enough of the aqueous dispersing medium is employed to provide a liquid formulation having a solids content from about 35 to about 60 percent by weight of the total composition.

The partially carbonized cellulosic material employed above is obtained by heating wood, or other cellulosic material, such as, for example, lignite, peat, corn stalks or peanut hulls, at an elevated temperature for a period of time sufficient to cause a reduction in the weight of the cellulosic material of from 10 to 35 percent, preferably 15 to 30 percent, of its original dry weight. This operation effects a partial carbonization of the cellulosic material with the resulting production of a tan to dark brown cellulosic mass which is highly friable. In other terms, partial carbonization means that the cellulosic mass has been heated sufficiently to cause initial decomposition and the loss of water and some volatile organic material. The heat treatment is terminated well before the production of ordinary charcoal. Wood charcoal is considerably less effective for the purposes of this invention. Temperatures for the heating operation can vary below those at which rapid combustion—burning with a flame—is produced to as low as 180° C. Because of its ready availability and greater ease of processing the preferred cellulosic material is wood sawdust. Though mechanical working of the cellulosic materials to provide the desired, finely divided particle size can be prior to the heat treating operation, it is preferred to suitably grind the cellulosic material after heating it. "Dry weight," as employed above, means substantially all free moisture has been removed, e.g. such moisture as can be removed by seasoning at normal room temperatures or by drying at 105° C. for 20 hours. The terminology "finely divided," as applied to the partially carbonized cellulosic material, means that the material has an average particle size small enough to pass through an 80 mesh screen, preferably a 160 mesh screen, of the Tyler mesh series.

The water-swellable organic extender, mentioned above as a component of the phenolic resin formulation, is a water-adsorptive or water-swellable material capable of being dispersed in water to provide a viscous mass. It should be noted that such an extender also functions as a thickener for the adhesive composition.

There are several sources for such water-swellable organic materials. For instance, some organic materials can be suitably causticized by treatment with an alkali metal hydroxide to provide water-swellable organic extenders. These include amylaceous materials, i.e. containing starches, such as flours obtained by processing wheat, corn, oats, rye and the like grains. Other materials of this nature are the pentosan residues obtained by chemical treatment of oat hulls, corn cobs and the like remnants of grain processing. Still other sources of the water-swellable organic extenders are amylaceous materials that have been heated in the presence of water.

Many of the water-swellable organic extenders will be essentially water-adsorbing forms of a polysaccharide, i.e. a polysaccharide which is water-soluble or has been made water dispersible by chemical modification, e.g. as by reaction with an alkali, etherification or esterification. Naturally water-soluble polysaccharides include, in addition to grain derivatives mentioned above, the various natural gums such as gum arabic, gum tragecanth, dextrin and the like. Materials with chemical modification include water dispersible forms of carboxymethyl cellulose ether, ethyl cellulose, methyl cellulose ether, hydroxyethyl cellulose ether, methyl starch ether and the like derivatives of polysaccharides.

When causticized organic materials are used as water-swellable organic extenders, it is most convenient to prepare the causticized form of the aforementioned organic materials in situ while formulating the adhesive composition. Enough of an alkali metal hydroxide, such as sodium hydroxide, is added to the resin formulation to causticize or swell the organic material. The amount of alkali metal hydroxide employed will fall within the limits of from about 5 to about 35 percent by weight of the organic material.

Phenolic resins suitable for employment in the invention are thermosetting, base catalyzed, partial condensation products (soluble in aqueous solvents) of one or more hydroxy aromatic compounds (phenols) and one or more suitable aldehydic materials. Aldehydic, as employed herein, refers to aldehydes and similarly acting materials. From about 1.8 to about 3, preferably from 2.0 to 2.3 chemical equivalents of the aldehydic material, are reacted with each mole of the phenol used. Particular condensation products are obtained by partially reacting, in appropriate proportions to provide a thermosetting product, a phenol, such as phenol, cresol, resorcinol, 3,5-xylenol with a suitable aldehydic material. Specific examples of suitable aldehydes, or similarly acting materials, are aqueous formaldehyde, para-formaldehyde, trioxymethylene and the like methylene providing materials. Also operable are acetaldehyde, furfuraldehyde and the like aldehydic materials which react with the mentioned phenols to form soluble, intermediate, polycondensation products.

It will be observed that the phenols specified are those having at least 3 reactive ring positions, i.e. at least 3 nuclear carbon atoms having substituent hydrogen atoms in ring positions ortho and para to a hydroxy group. If desired, other phenols having less than 3 active positions can be used in admixture with one or more of the above-mentioned phenols, but it is essential in order to provide a thermosetting composition that at least the predominant portion of the phenolic reactant employed is of the class having 3 active ring positions.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60, preferably 38 to 50, percent by weight solids. A basic catalyst is added to the reaction mixture and the resulting system is heated at an elevated temperature to provide a partially condensed, fusible resin, which is at least water-dispersible in the presence of alkali, if not completely soluble therein. Exemplary aqueous solvents that can be employed as the reaction medium include, in addition to water, mixtures of water with the lower water-soluble alkanols, ketones and the like organic solvents miscible with water.

Another fundamental component of the adhesive formulation is a small but catalytically effective amount of a catalyst for thermosetting or curing the phenolic resin. The catalyst is basic in nature and may be inorganic or organic. Examples of suitable basic catalysts are the alkali metal hydroxides (an excess of the alkali metal hydroxide used to causticize the organic extender is satisfactory), alkali metal carbonates, alkali metal silicates, alkali metal borates, alkali metal phosphates, ammonium hydroxide or such water-soluble basic organic compounds as the amines including primary, secondary and tertiary alkylamines or arylamines. Examples of the latter materials are methylamine, dimethylamine, trimethylamine, ethylenimine, pyridine, aniline and the like. A preferred catalyst system utilizes an alkali metal carbonate in an amount within the range of 2 to 20 percent by weight of the resin solids.

The solid adhesive formulation components of the invention are dispersed or dissolved, as the case may be, in a sufficient amount of an aqueous solvent medium, which may be water or mixtures thereof with a water-soluble alcohol, to provide a readily flowable or mechanically spreadable composition. For most applications, the total solids of the extended glue compositions of the invention are within the range from about 35 to about 65 percent by weight of the total composition. Preferably, the solids content of the glue composition is within the range from about 40 to 55 percent by weight of the total composition.

In preparing a glue formulation of the invention, phenolic resin, catalyst, aqueous dispersing medium and the above-described combination of extenders can be mixed together in any order. Usually, with the addition of each component, the resulting mixture is stirred or otherwise mixed, preferably at room temperature, until a uniform blend at a desired consistency is obtained. The blend consistency can be controlled by adjusting the amount of aqueous solvent medium used within the aforementioned limits.

However, when a causticized organic material is employed as the water-swellable extender, it is good procedure to prepare it in situ. To do this, it is preferred to add the glue components in a predetermined order. For convenience in describing this order of mixing, the components of an extended adhesive composition of the invention will have the designations set forth in the following schedule.

| Designation: | Component |
|---|---|
| W | Finely divided, partially carbonized cellulosic material. |
| A | Alkali metal hydroxide for causticizing the organic extender. |
| E | Extending organic material reactive with alkali metal hydroxides. |
| C | Catalyst for promoting the thermosetting reaction of the resin. |
| M | Aqueous solvent medium. |
| R | Soluble phenolic resin. |

In mixing the aforementioned ingredients, the order in which they are brought together is critical within certain limits. The general mixing order is set forth below for those materials, as delimited by the brackets, for which the sequence of addition must be controlled. Within the brackets are materials for which the order of addition is immaterial. The mixing schedule proceeding from left to right is as follows:

$$[M,E,W]_1 \ [M,A,W]_2 \ [M,R,C]_3 \ [M,R,W]_4$$

For example, the materials within the brackets $[M,A,W]_2$ are added to a mixture of the materials within the brackets $[M,E,W]_1$; the materials within the brackets $[M,R,C]_3$ are added to the resulting mixture of the materials within the brackets $[M,E,W]_1$ and $[M,A,W]_2$; etc.

In any one bracketed group of materials, the components therein can be added to the formulation simultaneously or in any order. Though mixing with the addition of each of the components is preferred, it is not necessary. When, in the foregoing schedule, a component appears in more than one bracketed group of materials, the total amount thereof to be added can be apportioned, as desired, among the indicated points of addition so as to provide the resulting mixture with a convenient consistency for mixing. This is particularly true of the aqueous solvent medium (M). It is added to the formulation, as needed, to produce a consistency permitting easy mixing and effective application to a surface to be bonded.

The extended adhesive formulations prepared in accordance with the invention are particularly well adapted for the bonding of wood veneers to manufacture plywoods. Such adhesive formulations are spread on the wood plies in amounts ranging from about 18 to about 30 pounds of total solids per thousand square feet of double glue line. The assembly time can vary from about 5 to about 30 minutes or more and preferably from 10 to about 20 minutes. The press time for satisfactory results can be within the range from about 3 to about 10 minutes or more depending upon the temperature of the platens, the plies being bonded, the number of panels per opening and the like considerations, such as are apparent to those persons skilled in the art. After having been pressed and thoroughly cured at the bonding or curing temperature for the glue formulation, the plywood is removed from the press and stacked for conditioning to a suitable residual moisture content.

In a specific embodiment of the invention an extended phenolic resin adhesive formulation was prepared having 100 percent total extension of which 10 percent was with water-swellable organic extender and 90 percent was with a partially carbonized wood. The composition schedule and mixing times are set forth in the following table.

TABLE

| Component | Amount (grams) | Stirring Time (minutes) |
|---|---|---|
| Water | 12.5 | |
| Wheat Flour | 1 | 2 |
| 50 Percent Aqueous Caustic | 2.2 | 4 |
| Partially Carbinized Douglas Fir [1] | 3.9 | 10 |
| Water | 2 | 2 |
| Sodium Carbonate | 0.9 | 5 |
| Commercial Phenolic Resin (aqueous solution with 42.5 percent resin solids) | [2] 25 | |
| Partially Carbonized Douglas Fir [1] | [2] 5.7 | 5 |
| Water | 4.8 | |

[1] Douglas Fir heartwood veneer was reduced to sawdust which was then heated in an open beaker for 0.75 hour at 190° C. The resulting partially carbonized wood was ground to a particle size small enough to pass through a 160 mesh screen. During the heating operation the sawdust underwent a weight loss equal to 25 percent of its original weight. The color deepened to a dark brown.

[2] These components were added alternately in several increments with intervening mixing of about two minutes.

Three ply Douglas fir heartwood panels, 6 x 6 inches, were constructed of ⅛ inch veneer with the above prepared glue formulation. The glue formulation was spread on the veneer with a brush at a spread rate of 52.8 pounds per 1,000 square feet of double glue line. The assembled panels were given an assembly time of ten minutes, after which they were pressed in a 6 inch square heated press, one per opening, at 200 p.s.i. and 135° C. platen temperature for 3.5 minutes.

Two 1 x 3 inch specimens were taken from the center of the cured panel. These specimens were sheared at the glue line with a knife blade after being boiled for 4 hours. The average percentage wood failure as the result of such testing was determined by visual observation to be 87 percent.

In a similar manner other cellulosic materials, such as poplar, pine and the like woods, as well as lignite, peat and corn stalks, which materials have been heated at an elevated temperature to cause a weight loss within the range of 15–35 percent of their original dry weight and thereafter ground to size small enough to pass an 80 mesh screen, are substituted for the Douglas fir in the foregoing operations to provide highly extended phenolic resin based glues suitable for the manufacture of exterior grade plywood.

What is claimed is:

1. A liquid adhesive composition comprising:
   (a) one part by weight of a water-soluble, thermosetting, phenol-aldehydic resin,
   (b) from about 0.01 to about 0.5 part by weight of a water-swellable organic extended selected from the group of water-adsorbing polysaccharides consisting of amylaceous materials, pentosan residues, natural gums and polysaccharide ether derivatives, the aforesaid being dispersible in water to provide a viscous mass,
   (c) at least a material proportion up to about 1 part by weight of a finely divided, partially carbonized, cellulosic material obtained by heating the cellulosic material at an elevated temperature until it undergoes a weight loss of from about 10 to about 35 percent of its original dry weight,
   (d) a catalytic amount of a basic alkali metal catalyst suitable for initiating the thermosetting reaction of the resin, and
   (e) sufficient water such that the total solids of the liquid adhesive composition is within the range from about 35 to about 65 percent by weight of the total composition.

2. A liquid adhesive composition as in claim 1 wherein the resin is a water-soluble, thermosetting resin obtained by partially condensing in the presence of a basic catalyst from about 1.8 to about 3 moles of formaldehyde per mole of phenol.

3. A liquid adhesive composition as in claim 1 wherein the catalyst is an alkali metal carbonate.

4. A liquid adhesive composition as in claim 1 wherein the water-swellable organic extender is a causticized amylaceous material.

5. A liquid adhesive composition as in claim 1 wherein the water-swellable organic extender is a causticized, pentosan containing residue from the acid hydrolysis of oat hulls and corn cobs.

6. A liquid adhesive composition as in claim 1 wherein the water-swellable organic extender is a causticized amylaceous material and the cellulosic material is wood.

7. A liquid adhesive composition as in claim 1 wherein the cellulosic material is heated at an elevated temperature until it undergoes a weight loss of from about 15 to 30 percent of its original dry weight.

8. A method for the production of a highly extended, liquid, phenolic resin adhesive composition which comprises mixing together:
   (1) one part by weight of a water-soluble thermosetting, phenol-aldehydic resin, hereinafter designated R,
   (2) from about 0.1 to about 0.5 part by weight of an organic extender selected from the group consisting of amylaceous materials and pentosan residues reactive with alkali metal hydroxides, hereinafter designated E,
   (3) sufficient alkali metal hydroxide for causticizing the organic extender, hereinafter designated A,
   (4) at least a material proportion up to about 1 part by weight of finely divided, partially carbonized, cellulosic material obtained by heating the cellulosic material at an elevated temperature until it undergoes a weight loss of from about 10 to about 35 percent of its original dry weight, said partially carbonized, finely divided cellulosic material being hereinafter designated W,
   (5) a catalytic amount of a basic, alkali metal catalyst suitable for initiating the thermosetting reaction of the resin, hereinafter designated C,
   (6) sufficient aqueous dispersing medium such that the total solids of the liquid adhesive composition is within the range from about 35 to about 65 percent by weight of the total composition, hereinafter designated M, said mixing being conducted according to the schedule proceeding from left to right as follows:

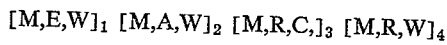

wherein groups of materials within the brackets can be brought together in any order and the groups of materials, as delimited by the brackets, are brought together in the sequence designated by the subscripts, with intervening mixing sufficient to produce a uniform composition; the total amount of any component added being within the above prescribed proportions.

9. A method as in claim 8 wherein the resin is a water-soluble, thermosetting resin obtained by partially condensing in the presence of a basic catalyst from about 1.8 to about 3 moles of formaldehyde per mole of phenol.

10. A method as in claim 8 wherein the catalyst is selected from the group consisting of alkali metal carbonates.

11. A method as in claim 8 wherein the organic extender is a causticized, amylaceous material.

12. A method as in claim 8 wherein the organic extender is a causticized, pentosan containing residue from the acid hydrolysis of oat hulls and corn cobs.

13. A method for preparing a partially carbonized cellulosic material for use as an extender which comprises heating a cellulosic material sufficient to cause a reduction in weight of from 10 to 35 percent of its original dry weight and grinding the heat treated cellulosic material to provide a finely divided partially carbonized cellulosic extender.

14. A method as in claim 13 wherein the heat treated cellulosic material is ground to a particle size small enough to pass through an 80 mesh screen of the Tyler mesh series.

15. A composition as in claim 1 wherein the partially carbonized cellulosic material is partially carbonized wood.

16. A method as in claim 8 wherein the partially carbonized cellulosic material is partially carbonized wood.

References Cited

UNITED STATES PATENTS

| | | | |
|---|---|---|---|
| 2,507,465 | 5/1950 | Ayers | 260—17.2 |
| 2,675,336 | 4/1954 | Stephan | 260—17.2 |
| 3,282,869 | 11/1954 | Bryner | 260—17.2 |
| 3,231,526 | 1/1966 | Wilson | 260—17.2 |
| 3,258,436 | 6/1966 | Stephens | 260—17.2 |

WILLIAM H. SHORT, *Primary Examiner.*

E. M. WOODBERRY, *Assistant Examiner.*